United States Patent
Ruppert et al.

(10) Patent No.: US 11,555,726 B2
(45) Date of Patent: Jan. 17, 2023

(54) METERING SYSTEM FOR DISTRIBUTING PARTICULATE MATERIAL

(71) Applicant: CNH Industrial Canada, Ltd., Saskatoon (CA)

(72) Inventors: Rex Ruppert, Benson, MN (US); Joel Denis, Saskatoon (CA)

(73) Assignee: CNH INDUSTRIAL CANADA, LTD., Saskatoon (CA)

( * ) Notice: Subject to any disclaimer, the term of this patent is extended or adjusted under 35 U.S.C. 154(b) by 372 days.

(21) Appl. No.: 16/810,276

(22) Filed: Mar. 5, 2020

(65) Prior Publication Data

US 2021/0278265 A1 Sep. 9, 2021

(51) Int. Cl.
| | |
|---|---|
| *G01F 11/24* | (2006.01) |
| *A01C 7/10* | (2006.01) |
| *A01C 15/00* | (2006.01) |
| *A01M 9/00* | (2006.01) |

(52) U.S. Cl.
CPC .............. *G01F 11/24* (2013.01); *A01C 7/102* (2013.01); *A01C 15/00* (2013.01); *A01M 9/0092* (2013.01)

(58) Field of Classification Search
CPC ......... A01C 7/102; A01C 15/00; A01C 7/127; A01C 15/04; A01C 7/124; A01M 9/0092; B65G 53/4633; G01F 11/24
See application file for complete search history.

(56) References Cited

U.S. PATENT DOCUMENTS

| | | | |
|---|---|---|---|
| 3,052,383 A | * | 9/1962 | Transeau ........... B65G 53/4633 222/368 |
| 4,264,023 A | | 4/1981 | Stocks et al. |
| 4,473,016 A | | 9/1984 | Gust |
| 4,793,523 A | | 12/1988 | Bailey et al. |
| 4,823,993 A | * | 4/1989 | Siegel ............... B65G 53/4633 222/368 |

(Continued)

FOREIGN PATENT DOCUMENTS

| | | |
|---|---|---|
| CN | 205213369 | 5/2016 |
| CN | 108936756 | 12/2018 |
| DE | 202019000426 U1 * | 3/2020 |

OTHER PUBLICATIONS

Sure Stand Seeder Models SSP4, SSP5, and SSP6 Operator's Manual by Landoll; 34 pages; accessed on Jul. 18, 2019 at: http://www.landoll.com/wp-content/uploads/2018/03/Sure_Stand_Seeder_SSP4-5-6_Ops_7K555rev0916.pdf.

(Continued)

*Primary Examiner* — Patrick M. Buechner
(74) *Attorney, Agent, or Firm* — Rebecca Henkel; Rickard Demille (57) ABSTRACT

A metering system for distributing particulate material includes a meter housing containing a metering wheel. An inlet and/or outlet of the meter housing provides a projection extending into the opening of the inlet and/or outlet so that the flow of particulate material is optimized. This can provide even distribution of such material, including at low rotating speeds such as 5 RPM, while using a polyurethane metering wheel with straight vanes. In one aspect, projections extending into the inlet on opposing sides can substantially form an hourglass shape, and the outlet can comprise a substantially diagonal shape, analogous to a parallelogram, instead of more traditional rounded/rectangular shapes.

14 Claims, 6 Drawing Sheets

(56) References Cited

U.S. PATENT DOCUMENTS

| | | | | |
|---|---|---|---|---|
| 5,114,053 A * | 5/1992 | Beirle | ................ | B65G 53/4633 |
| | | | | 222/368 |
| 5,129,554 A * | 7/1992 | Futamura | ........... | B65G 53/4633 |
| | | | | 222/368 |
| 5,320,258 A * | 6/1994 | Paul | ................... | B65G 53/4633 |
| | | | | 222/368 |
| 8,132,521 B2 | 3/2012 | Snipes et al. | | |
| 9,360,121 B2 | 6/2016 | Garner | | |
| 9,801,330 B2 | 10/2017 | Bent et al. | | |
| 2010/0237267 A1* | 9/2010 | Chuang | .............. | B65G 53/4633 |
| | | | | 251/304 |
| 2013/0146797 A1* | 6/2013 | Schneider | ............... | F16K 27/00 |
| | | | | 251/304 |
| 2019/0023504 A1* | 1/2019 | Roberge | ............... | A01C 21/002 |

OTHER PUBLICATIONS

Fenix III seed meter by Vaderstad: 5 pages; accessed on Jul. 18, 2019 at: https://www.vaderstad.com/en/service--parts/genuine-parts/fenix-iii/.

* cited by examiner

METERING SYSTEM FOR DISTRIBUTING PARTICULATE MATERIAL

FIELD OF THE INVENTION

The present invention pertains to agricultural equipment and, more specifically, to a metering system for distributing particulate material in which an inlet and/or outlet of a meter housing containing a metering wheel provides a projection extending into the opening of the inlet and/or outlet so that the flow of particulate material is optimized.

BACKGROUND OF THE INVENTION

Agricultural product delivery systems are known to utilize various mechanisms, including mechanical and pneumatic systems to move granular or particulate material or product, such as fertilizer, seed, insecticide or herbicide, from a product supply chamber, through a series of elongated tubes that extend from a product supply chamber to a product applicator, and placing the product on, or in a growing medium, such as soil. Such agricultural product delivery systems are commonly employed in planters, air drills, fertilizer and pesticide applicators and a variety of other agricultural implements.

Systems for metering particulate material currently include a rounded/rectangular inlet from a bin and a rounded/rectangular outlet to a pressurized tube with a multi-vane metering wheel in between. The metering wheel typically includes multiple vanes to implement an airlock to prevent air flow from the pressurized tube from flowing into the bin and suspending material in the bin. Metering wheels with helical or spiral vanes are known for allowing more even distributions of material through a wide range of rotating speeds, such as 5 to 100 RPM. However, such helical or spiral vanes can sometimes lose air pressure due to deformation relative to the wheel. The helical or spiral shape also increases manufacturing complexity. A need therefore exists to provide a system for metering of particulate material which can maintain the evenness capability of helical or spiral vanes but without the foregoing disadvantages.

SUMMARY OF THE INVENTION

The invention provides a metering system for distributing particulate material in which an inlet and/or outlet of a meter housing containing a metering wheel provides a projection extending into the opening of the inlet and/or outlet so that the flow of particulate material is optimized. This can provide even distribution of such material, including at low rotating speeds such as 5 RPM, while using a polyurethane metering wheel with straight vanes. In one aspect, projections extending into the inlet on opposing sides can substantially form an hourglass shape, and the outlet can comprise a substantially diagonal shape, analogous to a parallelogram, instead of more traditional rounded/rectangular shapes.

In one aspect, a metering wheel with straight vanes can be used in a meter housing. Instead of a rectangular inlet and outlet of the housing, the inlet and outlet can provide novel passage shapes, such as a chevron or "V." Granular material can still enter through the top (inlet) and exit through the bottom (outlet), but through a different shaped inlet and outlet. To construct, a stainless-steel tube can be pressed into a plastic block/housing. The metering wheel can comprise a flexible rubber type material (Urethane) with straight vanes. The vanes of the metering wheel can be press fitted against the stainless-steel tube to create a seal, and thus an airlock. As the meter turns, material can drop in from the inlet and out through the outlet. Two to three vanes would still be in contact with a side wall of the housing at all times to maintain the airlock/seal. The novel shape of inlets/outlets can advantageously create a staggered start/stop across the meter wheel. The tube can include a ¼" wide web between adjacent windows, allowing a washer to be arranged in between meter wheels. In one aspect the inlet can have an hourglass shape, and the outlet can have an angled line on one side and a chevron on the other side Specifically then, one aspect of the present invention can provide a metering system for distributing particulate material, including: a meter wheel having multiple vanes; a meter housing containing the meter wheel, in which the meter housing is configured to form an airlock between at least two of the vanes and an interior surface of the meter housing; an inlet arranged at a first side of the meter housing, the inlet being defined by a first circumferential edge producing an opening in the first side, in which the inlet is configured to allow particulate material to flow into the meter housing and onto the meter wheel; and an outlet arranged at a second side of the meter housing that is opposite to the first side, the outlet being defined by a second circumferential edge producing an opening in the second side, in which the outlet is configured to allow particulate material to flow away from the meter wheel and out of the meter housing, in which at least one of the first and second circumferential edges comprises a projection extending into the opening.

Another aspect of the present invention can provide a metering system for distributing particulate material, including: a compartment configured to carry particulate material; an actuated gate, which could be electronically controlled, disposed below the compartment; a meter section disposed below the gate, the meter section including first and second meter segments, each meter segment including: a meter wheel having multiple vanes; a meter housing containing the meter wheel, in which the meter housing is configured to form an airlock between at least two of the vanes and an interior surface of the meter housing; an inlet arranged at a first side of the meter housing proximal to the gate, the inlet being defined by a first circumferential edge producing an opening in the first side, in which the inlet is configured to allow particulate material to flow into the meter housing and onto the meter wheel when the gate is open; and an outlet arranged at a second side of the meter housing distal to the gate, the outlet being defined by a second circumferential edge producing an opening in the second side, in which the outlet is configured to allow particulate material to flow away from the meter wheel and out of the meter housing, in which at least one of the first and second circumferential edges comprises a projection extending into the opening.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

While the invention is described herein in connection with certain preferred embodiments, there is no intent to limit it to those embodiments. On the contrary, the intent is to cover all alternatives, modifications and equivalents within the spirit and scope of the invention as defined by the appended claims.

DETAILED DESCRIPTION OF THE INVENTION

Figure 1:
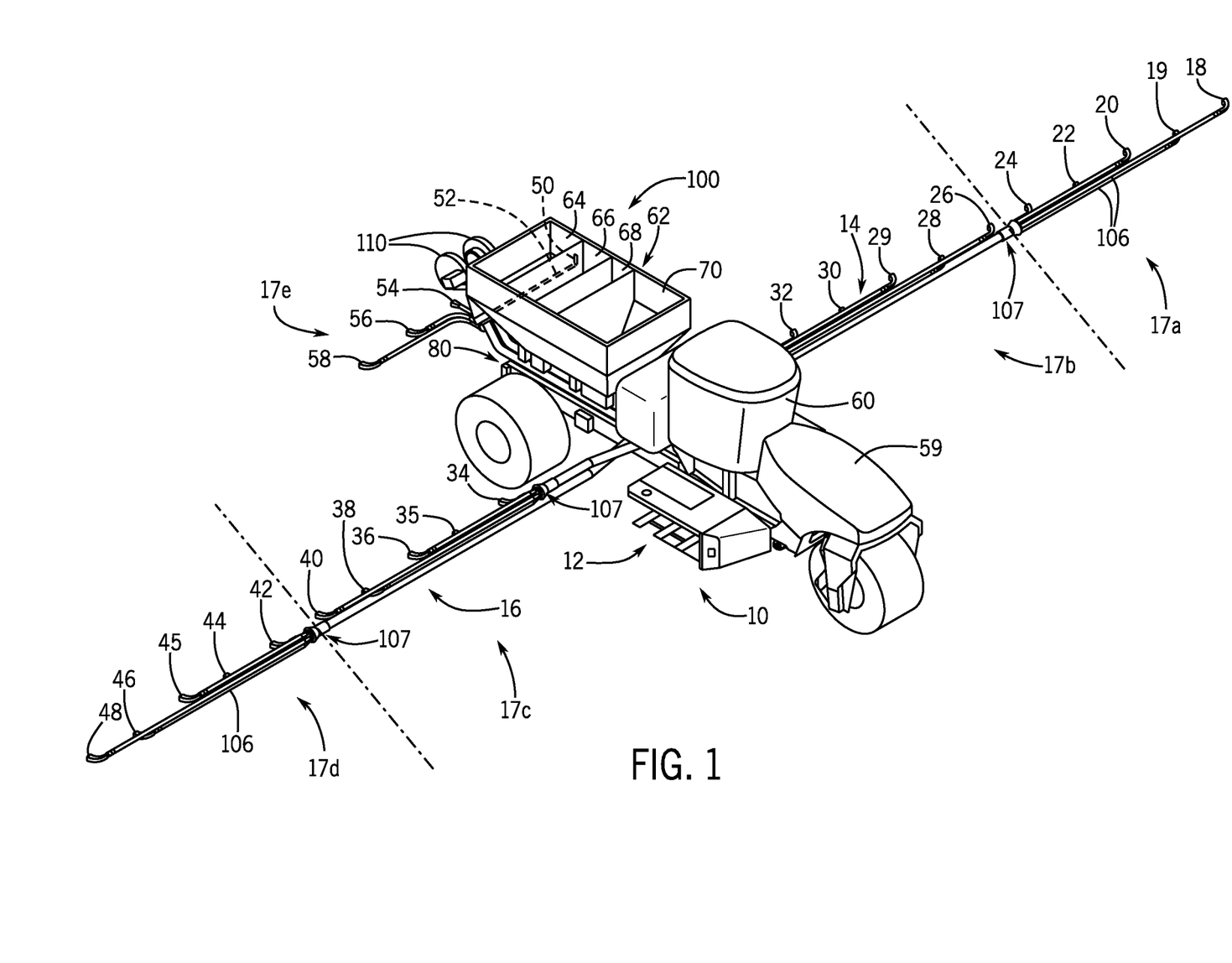
FIG. 1 illustrates an isometric view of an exemplary embodiment of an agricultural application implement, in the form of a dry granular applicator, comprising a metering system in accordance with an aspect of the present invention.
Figure 2:
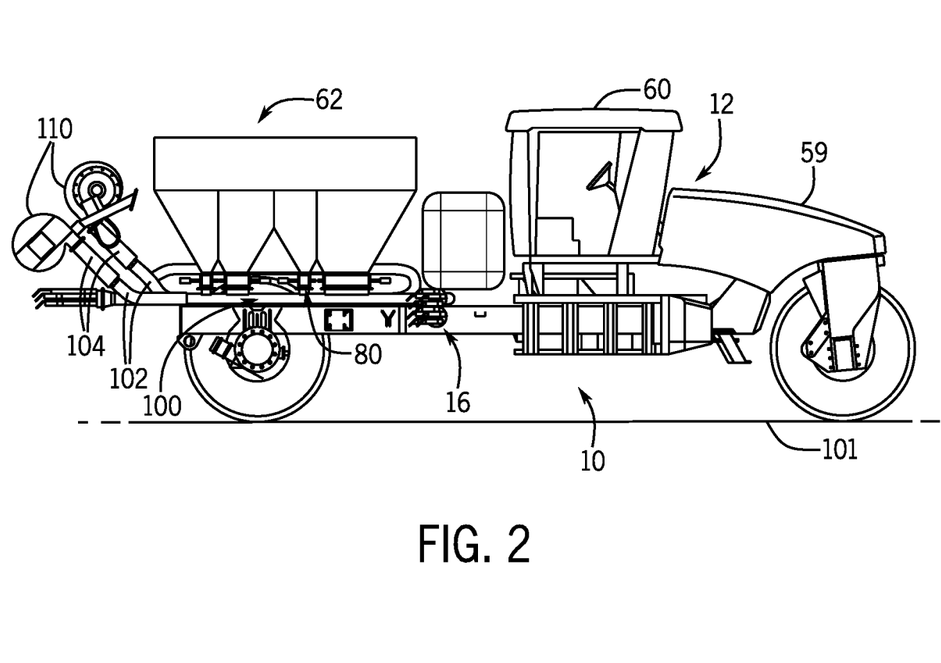
FIG. 2 illustrates a side elevation view of the applicator of FIG. 1.

Referring now to the drawings, and more particularly to FIGS. 1 and 2, there is shown an agricultural application implement 10, which could be a dry pneumatic granular applicator. As is known in the art, implement 10 generally includes a large wheeled transport unit 12 such as truck or tractor, and laterally extending particle delivery booms 14 and 16, which may be pivoted to a stowed position close to the implement for storage or transport. Each boom 14, 16 extends laterally from the implement 10 in opposite directions. Each boom 14, 16 includes a plurality of boom sections 17, such as left outer and left inner boom sections 17a, 17b of boom 14, and right inner and right outer boom sections 17c, 17d of boom 16. Each boom section 17 is defined by a large diameter supply line 102 for supplying the boom section with granular or particulate material, such as seed, fertilizer, herbicide, insecticide and the like. Each boom section 17 includes a plurality of boom tubes or conduits terminating at particle delivering units, which for the implement 10 are spreading outlets or nozzles. In the exemplary embodiment shown, left outer boom section 17a of boom 14 includes five nozzles 18, 19, 20, 22 and 24; left inner boom section 17b of boom 14 includes five nozzles 26, 28, 29, 30 and 32; right inner boom section 17c of boom 16 includes five nozzles 34, 35, 36, 38 and 40; and right outer boom section. 17d of boom 16 includes five nozzles 42, 44, 45, 46 and 48. Additionally, at the back of implement 10 there is a centrally mounted rear boom section 17e also defined by a large diameter supply line 102 for supplying the boom section with granular material. At the rear boom section 17e are five rear nozzles 50, 52, 54, 56 and 58 to provide full and complete coverage across the width of implement 10, including the area between the inboard-most nozzles 32 and 34 of booms 14, 16. The rear boom section 17e allows spread of the particulate material/product over/onto the ground over which the implement 10 passes for complete coverage. Although five boom sections 17, with five nozzles per boom section, are shown by way of example, in other aspects greater or fewer boom sections 17, and/or greater or fewer nozzles per boom section 17, can be provided within the scope of the invention.

The transport unit 12 can be self-propelled by an engine in an engine compartment 59 and can include an operator cab 60 having a Human Machine Interface (HMI) available to the user. In the exemplary embodiment shown, an uncovered tank 62, open to the environment and ambient atmospheric conditions, includes compartments 66 and 70 for carrying particulate material to be distributed by a metering array 80 for ultimate disbursement by nozzles 18-58. Further smaller compartments 64 and 68 are provided to supply micro-nutrients or other materials to the metering array 80. The supply of particulate in compartments 64, 66, 68, 70 can be replenished periodically from a supply vehicle (not shown).

With additional reference to FIG. 3, the metering array 80 is disposed below the compartments 64-70 of the tank 62 so that the metering can receive granular material from the various compartments when particular actuated gates (e.g., gates 82a-82d), which could be electronically controlled, are selectively open to various positions. A conveying system 100, which could be a pneumatic conveying system or assembly, is disposed below the metering array 80 so that the granular material can be distributed to the nozzles when metered by the metering array 80. The conveying system 100 includes multiple large diameter supply lines 102, which could be 5 inches in diameter, that extend from a plenum 104 at one end, under the compartments 64-70 and the metering array 80, and terminate at individual boom sections 17. At each boom section 17, the supply lines 102 and the particulate material or product transported therein are split by a suitable distribution structure or mechanism 107, such as a plurality of horizontal rotary distributors, among or into a number of secondary or smaller supply lines 106, which could be 2.5 inches in diameter, that are connected to individual nozzles 18-58.

To collect and drive the particulate material along the lines 102, one or more fans 110 can be operably connected to the plenum 104 opposite the inlet ends of lines 102 as described herein. The air flow from the fans 110 is directed through the plenum 104 and into the respective lines 102 as a result of the structure of the plenum 104. After the air flow passes through the plenum 104 and collects/entrains the particulate material from the compartments 64-70 via the metering array 80, the air flow continues to flow along each large diameter supply line 102, including with one or more 90° and/or 180° turns, to connect to the various boom sections 17. The fans 110 could be centrifugal fans that are 8 inches or less in diameter, and in some aspects, 6 inches or less.

Figure 3:
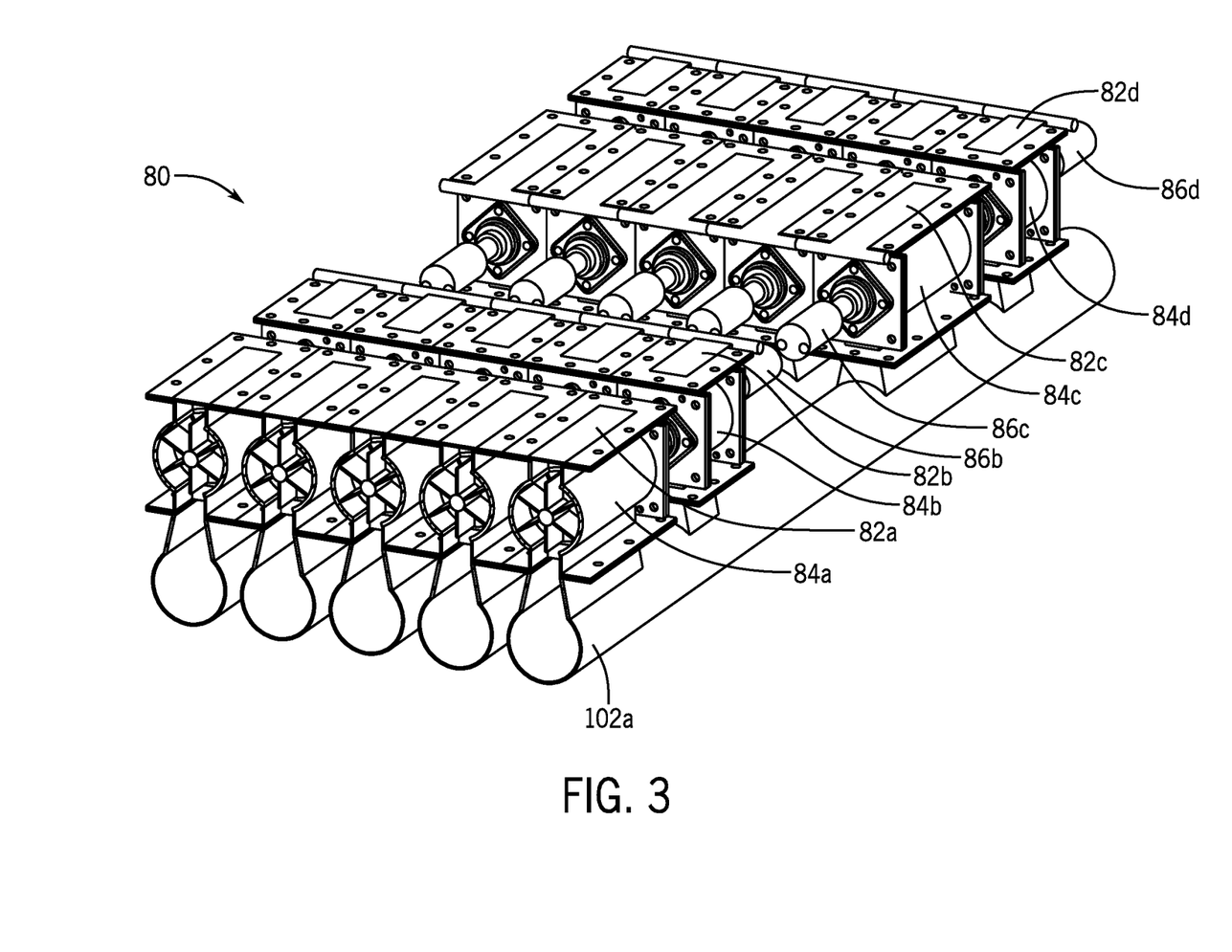
FIG. 3 illustrates an isometric view the metering system of the applicator of FIG. 1 in accordance with an aspect of the present invention.

As illustrated in FIG. 3, the metering array 80 is comprised of multiple metering sections (e.g., meter sections 84a-84d) disposed below gates (e.g., gates 82a-82d). For any given supply line 102 leading to a section 17, a meter section (e.g., meter sections 84a-84d) can be arranged for distributing granular material from a compartment to the supply line when a corresponding gate is open. For example, for a first supply 102a, a first meter section 84a can distribute granular material from compartment 70 into the first supply line 102a when a first gate 82a is open; a second meter section 84b can distribute granular material from compartment 68 into the first supply line 102a when a second gate 82b is open; a third meter section 84c can distribute granular material from compartment 66 into the first supply line 102a when a third gate 82c is open; and a fourth meter section 84d can distribute granular material from compartment 64 into the first supply line 102a when a fourth gate 82d is open.

Figure 4:
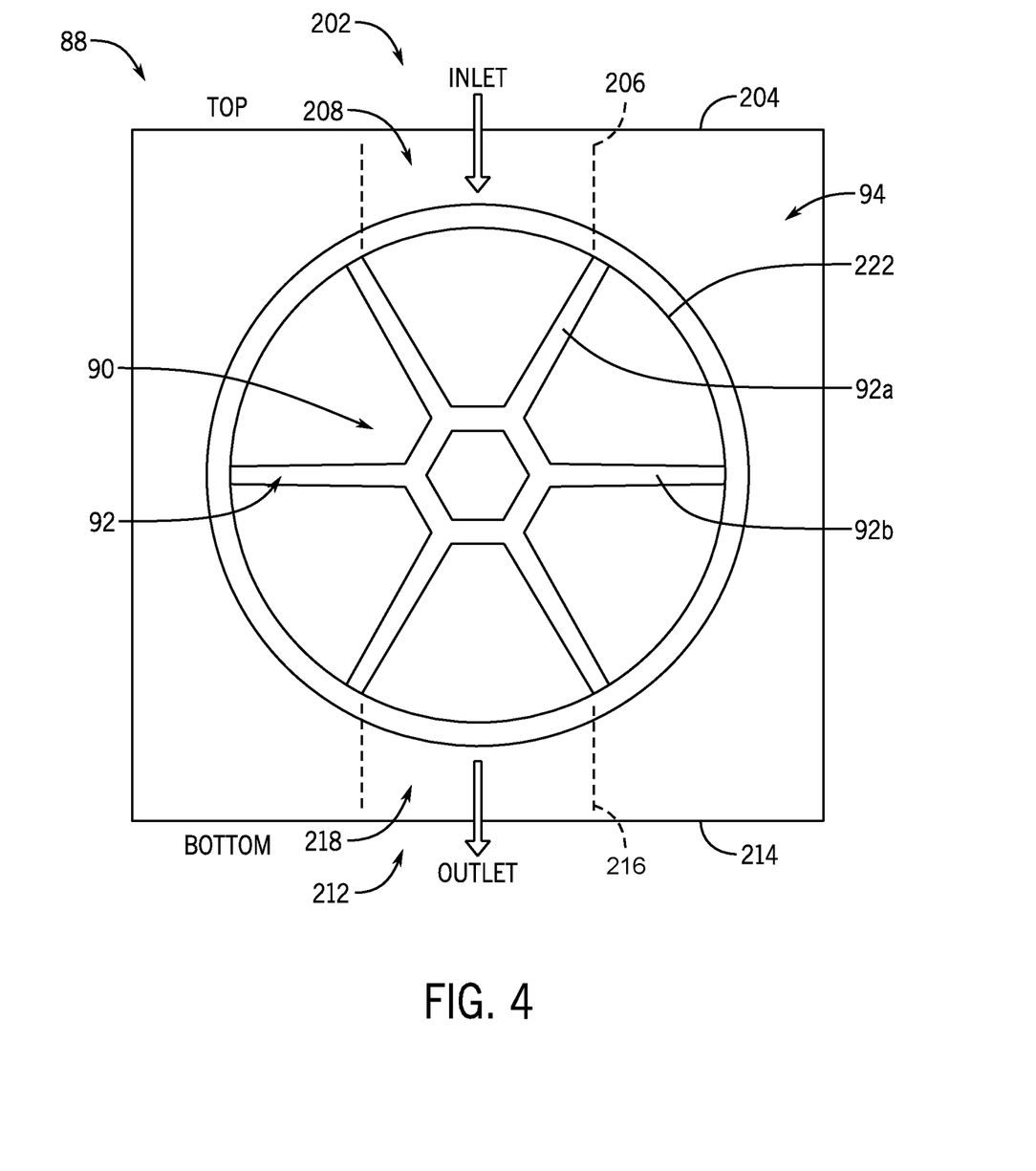
FIG. 4 illustrates a side view of a meter housing containing a meter wheel in the metering system of the applicator of FIG. 1 in accordance with an aspect of the present invention.

In addition, each meter section (e.g., meter sections 84a-84d) can comprise one or more individual meter segments. With additional reference to FIG. 4, a side view of an exemplar meter segment 88 is provided in accordance with an aspect of the invention. Each meter segments 88 can include a meter wheel 90 having multiple vanes 92, and a meter housing 94 containing the meter wheel 90. The meter segment 88 could have a discrete length, such as four (4) inches, with multiple meter segments 88 in a meter section having a cumulative length, such as five (5) meter segments 88 in the first meter section 84a having a cumulative length of twenty (20) inches. Accordingly, a given gate can be controlled to selectively open in order to expose one, some or all of the meter segments 88, in various degrees and at various times, to more precisely control the flow of granular material from a given compartment.

Also, actuated driveshafts (e.g., driveshafts 86b-86d) (see FIG. 3), which could be electronically controlled, configured with respect to each meter section, can be controlled to selectively rotate the meter wheel(s) 90 of each meter segment 88 in the meter section in a full dynamic range from stopped (0 RPM) to high speed (such as 110 RPM). For example, for the fourth meter section 84d, a fourth driveshaft 86d can be controlled to selectively rotate the meter wheel(s) 90 of the fourth meter section 84d; for the third meter section 84c, a third driveshaft 86c can be controlled to selectively rotate the meter wheel(s) 90 of the third meter section 84c; and so forth.

The housing 94 of each meter segment 88 can include an inlet 202. The inlet 202 can be arranged at a first side 204 of the housing 94, such as a top of the housing. The inlet 202 can be defined by a first circumferential edge 206 producing an opening 208 in the first side 204 (see also isometric view of FIG. 6). Accordingly, the inlet 202 is configured to allow particulate material to flow into the housing 94, and onto vanes 92 of the meter wheel 90, when a corresponding gate for the meter segment 88 is open.

Figure 6:
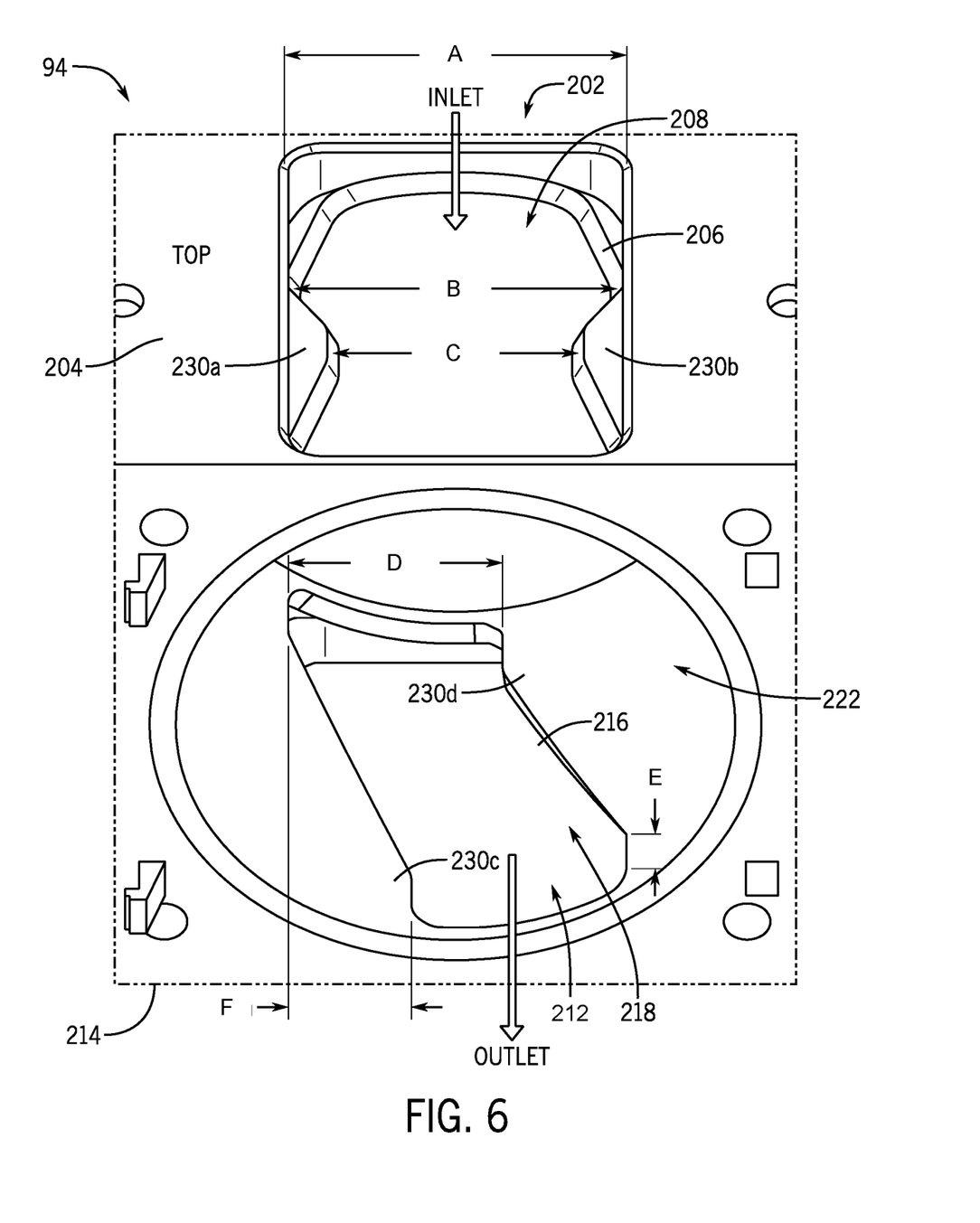
FIG. 6 illustrates an isometric view of the meter housing of FIG. 4, without the meter wheel, in accordance with an aspect of the present invention.

The housing 94 of each meter segment 88 can also include an outlet 212. The outlet 212 can be arranged at a second side 214 of the housing 94 that is opposite to the first side 204, such as a bottom of the housing. The outlet 212 can be defined by a second circumferential edge 216 producing an opening 218 in the second side 214. Accordingly, the outlet 212 is configured to allow particulate material to flow away from vanes 92 of the meter wheel 90, and out of the housing 94, for distributing into a corresponding supply line 102.

Figure 5:
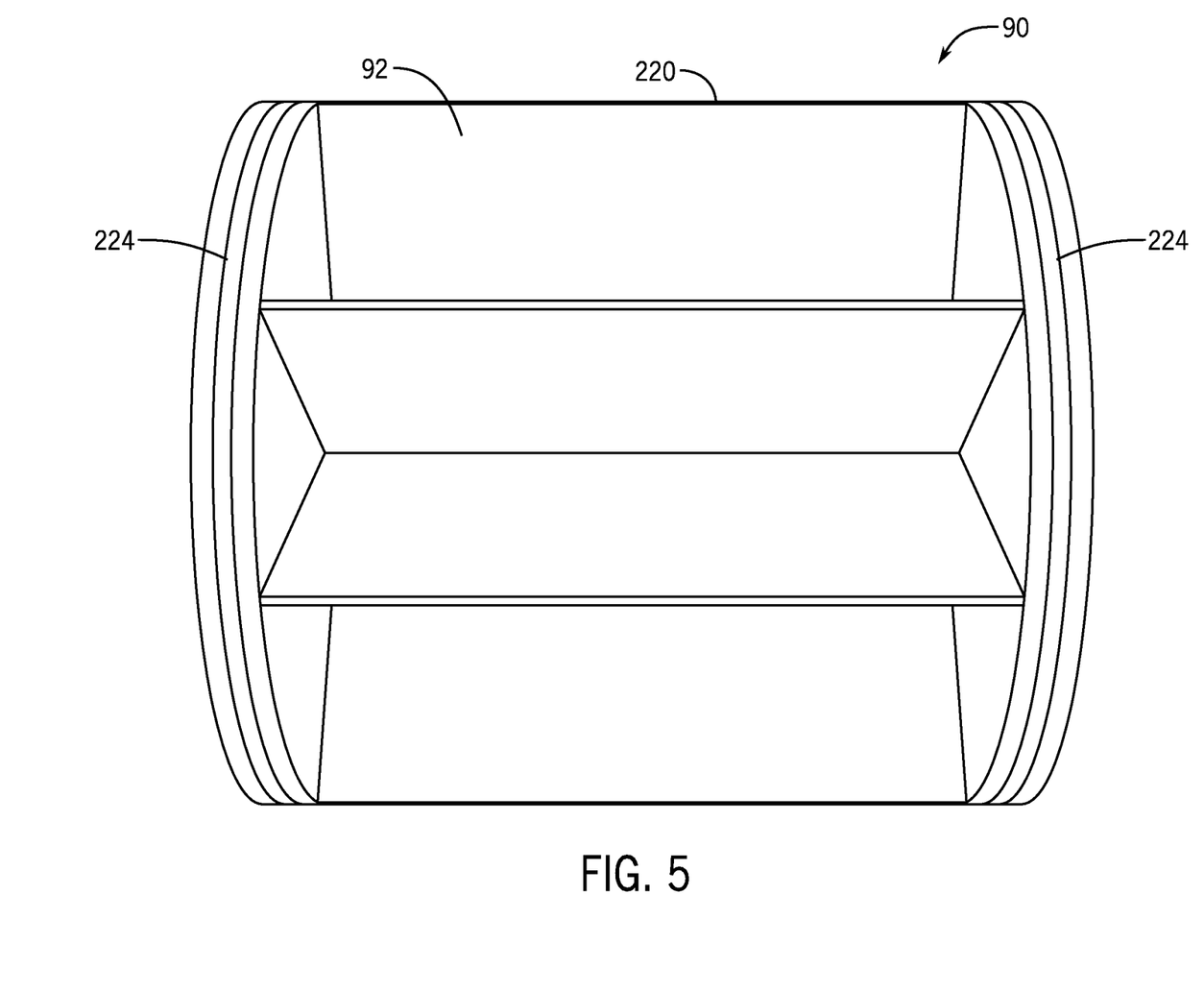
FIG. 5 illustrates an isometric view of the meter wheel of FIG. 4, without the meter housing, in accordance with an aspect of the present invention.

With additional reference to FIG. 5, an isometric view of an exemplar meter wheel 90 for a given meter segment 88, but without the housing 94 for ease of view, is provided in accordance with an aspect of the present invention. The wheel 90 can include various numbers of vanes 92, such as six (6) or eight (8) vanes, depending on the size of the housing 94 and/or desired distribution effect. Each vane 92 could comprise, for example, polyurethane. Each vane 92 can project outwardly from a center of the wheel 90 to produce a straight edge 220 for contacting an interior surface 222 of the housing 94 when rotated therein. Accordingly, at least two vanes 92, such as first and second vanes 92a, 92b (FIG. 4), and the interior surface 222 of the housing 94, can form an airlock in the housing 94, thereby separating the pressurized line from the open compartment. The airlock is configured to separate inlet and outlet pressures with minimal leakage while consistently metering product. In addition, washers 224 can be provided on sides of the wheel 90 to prevent granular material from spilling from one wheel 90 to another wheel 90 which may be adjacent in a meter section.

With additional reference to FIG. 6, an isometric view of an exemplar housing 94 for a given meter segment 88, but without the meter wheel 90 for ease of view, having various dimensions A-F, is provided in accordance with an aspect of the present invention. For distributing particulate material, edges of the inlet 202 and/or the outlet 212 can include one or more projections (e.g., projections 230a, 230b, 230c, 230d), which could be a substantially V-shaped or chevron pattern, extending into the openings so that the flow of the material is optimized. This can provide even distribution of such material, including at low rotating speeds such as 5 RPM, while using a polyurethane wheel 90 with straight vanes 92.

For example, in one aspect, the first circumferential edge 206 can include first and second projections 230a and 230b, respectively, extending into the inlet 202 on opposing sides to substantially form an hourglass shape. This shape can reduce shear at the vane edge 220, while maximizing inlet area. In addition, or alternatively, the second circumferential edge 216 can include third and fourth projections 230c and 230d, respectively, extending into the outlet 212 on opposing sides to form a substantially diagonal shape, analogous to a parallelogram. This can create a delay in product dropping out of the outlet, resulting in more consistent outlet flow at low RPM. Such foregoing edge configurations, instead of more traditional rounded/rectangular shapes, can allow for optimized flow according to the invention.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A metering system for distributing particulate material from an agricultural application implement, comprising:
   a meter wheel having a plurality of vanes;
   a meter housing containing the meter wheel, wherein the plurality of vanes are configured to contact an interior surface of the meter housing such that an airlock is formed between adjacent vanes of the plurality of vanes and the interior surface of the meter housing;
   an inlet arranged at a first side of the meter housing, the inlet being defined by a first circumferential edge producing a first opening in the first side, wherein the inlet is configured to allow particulate material to flow into the meter housing and onto the meter wheel; and
   an outlet arranged at a second side of the meter housing that is opposite to the first side, the outlet being defined by a second circumferential edge producing a second opening in the second side, wherein the outlet is configured to allow particulate material to flow away from the meter wheel and out of the meter housing,
   wherein at least one of the first circumferential edge or the second circumferential edge comprises first and second projections extending into the respective first opening or second opening,
   wherein the first and second projections form an hourglass shape.

2. The metering system of claim 1, wherein the plurality of vanes comprises at least six vanes.

3. The metering system of claim 1, wherein each vane of the plurality of vanes projects outwardly from a center to produce a straight edge for contacting the interior surface of the meter housing when rotated to form the airlock.

4. The metering system of claim 1, wherein the meter wheel comprises polyurethane.

5. The metering system of claim 1, wherein the respective first opening or second opening of the other of the at least one of the first circumferential edge or the second circumferential edge comprises a diagonal shaped opening.

6. The metering system of claim 5, wherein the first circumferential edge comprises the first and second projections extending into the first opening to form the hourglass shape, and wherein the second opening comprises the diagonal shaped opening.

7. A metering system for distributing particulate material from an agricultural application implement, comprising:
a compartment configured to carry particulate material;
an actuated gate disposed below the compartment;
a meter section disposed below the gate, the meter section comprising first and second meter segments, each meter segment including:
a meter wheel having a plurality of vanes;
a meter housing containing the meter wheel, wherein the plurality of vanes are configured to contact an interior surface of the meter housing such that an airlock is formed between adjacent vanes of the plurality of vanes and the interior surface of the meter housing;
an inlet arranged at a first side of the meter housing proximal to the gate, the inlet being defined by a first circumferential edge producing a first opening in the first side, wherein the inlet is configured to allow particulate material to flow into the meter housing and onto the meter wheel when the gate is open; and
an outlet arranged at a second side of the meter housing distal to the gate, the outlet being defined by a second circumferential edge producing a second opening in the second side, wherein the outlet is configured to allow particulate material to flow away from the meter wheel and out of the meter housing,
wherein at least one of the first circumferential edge or the second circumferential edge comprises first and second projections extending into the respective first opening or second opening,
wherein the first and second projections form an hourglass shape.

8. The metering system of claim 7, further comprising a supply line disposed below the meter section, wherein the outlet of each meter segment in the meter section are arranged proximal to the supply line.

9. The metering system of claim 7, further comprising an actuated driveshaft configured to rotate the meter wheels of each meter segment in the meter section.

10. The metering system of claim 7, wherein the plurality of vanes comprises at least six vanes.

11. The metering system of claim 7, wherein each vane of the plurality of vanes projects outwardly from a center to produce a straight edge for contacting the interior surface of the meter housing when rotated to form the airlock.

12. The metering system of claim 7, wherein the meter wheel comprises polyurethane.

13. The metering system of claim 7, wherein the respective first opening or second opening of the other of the at least one of the first circumferential edge or the second circumferential edge comprises a diagonal shaped opening.

14. The metering system of claim 13, wherein the first circumferential edge comprises the first and second projections extending into the first opening to form the hourglass shape, and wherein the second opening comprises the diagonal shaped opening.

* * * * *